Feb. 11, 1930.  A. J. PETERSON  1,746,675
TAP CHANGING SYSTEM
Filed Oct. 23, 1925
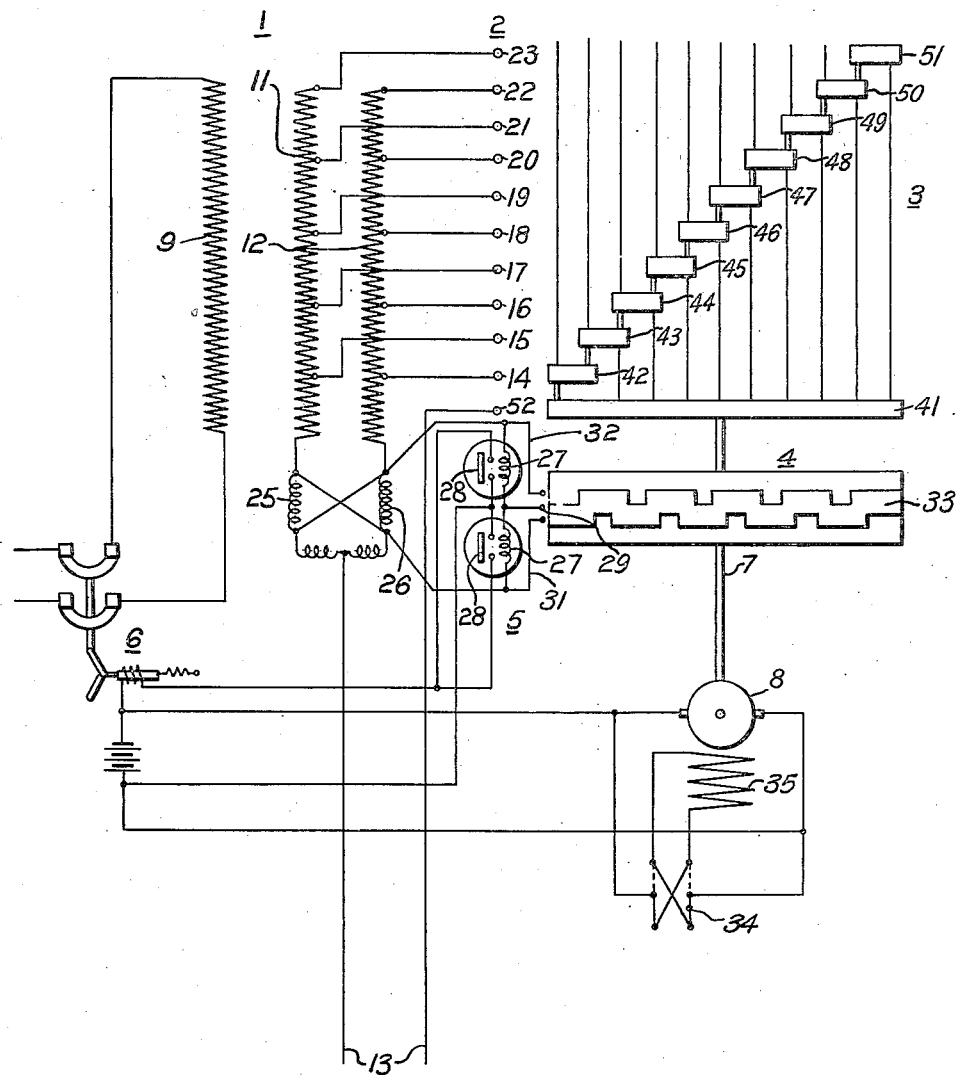
WITNESSES:
A.G.Schiefelbein.
Lester G. Budlong.
INVENTOR
Alfred J. Peterson.
BY
Wesley G. Carr
ATTORNEY Patented Feb. 11, 1930

1,746,675

UNITED STATES PATENT OFFICE

ALFRED J. PETERSON, OF WILKINSBURG, PENNSYLVANIA, ASSIGNOR TO WESTINGHOUSE ELECTRIC & MANUFACTURING COMPANY, A CORPORATION OF PENNSYLVANIA

TAP-CHANGING SYSTEM

Application filed October 23, 1925. Serial No. 64,481.

My invention relates to electrical transformer systems and particularly to time-limit protective systems for transformer tap-changing systems.

One object of my invention is to provide time-limit protection for the parallel windings of an electrical transformer during the time that the taps on certain of the windings are being adjusted.

Another object of my invention is to control the connections of the windings of the protective relays for transformer windings synchronously with the adjustments of the tap connections thereof.

In changing transformer taps under load, in certain classes of electrical transformers, it is customary practice to provide parallel windings and to open one of the windings and change the connections thereof, during which time the entire load is carried by the other winding or windings. Each of the windings is so constructed that it can safely transmit the entire load on the transformer for a limited period of time without overheating. In order to protect the several windings, I propose to connect time-limit relays therewith that shall be called upon to exercise their protective functions in accordance with the connections of the several windings with which they are associated. I accomplish this result by providing controlling means for shunting the several relays during the period that the corresponding windings are open-circuited. The period of time normally required for changing the tap connections is less than the time for which the relays are adjusted so that the relays will not operate to interrupt the entire circuit, by means of a circuit interrupter, or the like, during the normal operation of the tap-changer. The relay or relays return to their initial positions while they are shunt-circuited.

The single figure of the accompanying drawing is a diagrammatic view of circuits and apparatus embodying my invention.

My invention comprises, in general, a transformer 1 that is provided with a plurality of taps 2 whose connections are controlled by a drum 3 and a drum 4 that controls the connection of time-limit relay 5, that in turn controls a circuit interrupter 6 in circuit with the transformer 1. The drums 3 and 4 are on a common shaft 7 that is driven by a motor 8.

The transformer 1 comprises a primary winding 9 that is connected in series with the circuit-interrupter 6 and a pair of secondary windings 11 and 12 that are in parallel relation for supplying electrical energy to a load circuit 13. The secondary winding 11 is provided with a plurality of taps 15, 17, 19, 21 and 23 and the secondary winding 12 is provided with a plurality of taps 14, 16, 18, 20 and 22.

The windings 11 and 12 are provided with current transformers 25 and 26, respectively, the current transformers 25 and 26 being connected so as to normally oppose and neutralize the effect of each other upon the relays 6.

The relays 5 are of the time-element type and are diagrammatically shown as each comprising an operating winding 27 and a switch 28. The operating windings 27 are connected in series relation to each other and in parallel relation to the current transformers 25 and 26. The contact member 29 is connected to the mid-point of the relays 5 and contact members 31 and 32 are connected to the outer terminals of the relays 5.

The drum 4 comprises a band 33 of conducting material that alternately makes and breaks contact with contact members 31 and 32, thereby alternately shunt-circuiting one of the relays 5 with respect to the current transformers 25 and 26.

The shaft 7 is driven by the motor 8, the direction of rotation of which is controlled by a reversing switch 34 that controls its field winding 35. The reversing switch 34 may be manually controlled or controlled by any suitable mechanism (not shown).

The shaft 7 also rotates the tap-changing drum 3 which comprises a plurality of contact segments 41 to 51, inclusive, that are connected in series with each other and with the circuit 13 through a contact member 52. The segment 41 extends entirely around the drum and is always connected to one conductor of the circuit 13. The segments 42 to 51, inclusive, are adapted to successively engage the taps 14 to 23, inclusive, as the drum 3 rotates. The segments 42 to 51, inclusive, slightly overlap each other in echelon so that as the drum 3 turns from right to left, the tap 14 is first engaged by the segment 42, but before the segment 42 disengages, the tap 15 is engaged by the segment 43 with the result that, for a time, the taps 14 and 15 are in parallel circuit with the circuit 13 and supply energy thereto from the primary winding 9.

It is to be understood that in practice an elaborate system of stop switches and reversing switches are employed to automatically control the motor 8 and thereby govern the positions of the segments 42 to 51, inclusive, with respect to the taps 14 to 23, inclusive, but, since these form no part of my present invention, they are not shown or described in the present application.

Assuming the several component parts of the system to be in the relative positions shown in the drawings, the primary winding 9 energizes that portion of the secondary winding 12 between the tap 14 and the circuit 13. The circuit 13 comprises the current transformer 26, a portion of the secondary winding 12, the tap 14, the contact segment 42 and the contact segment 41. In this position, the secondary winding 12 carries the entire load of the circuit 13.

At the same time, the contact band 34 has completed a circuit between the contact members 29 and 31, thereby shunt-circuiting the lower relay 5. In this circuit, the neutralizing effect of the current transformers 25 and 26 upon each other is not available by reason of the fact that no current is traversing the current transformer 25. The current transformer 26 is in circuit with the operating winding 27 of the upper relay 5, the contact member 29, the contact band 34 and the contact member 31. Accordingly, the upper relay 5 is active and the lower relay 5 is inactive.

The time limit of the relays 5 is normally adjusted to be greater than the time required for the drum 3 to turn sufficiently to bring the contact 43 into engagement with the tap 15. With this connection, the primary winding 9 supplies energy to the lower sections of both the secondary windings 11 and 12 and the latter are in parallel relation to the circuit 13 through the contact segments 43 and 42 and 41 and corresponding taps 15, 14 and 52. At the same time, the contact band 34 completes a circuit through the contact members 32, 29 and 31, thereby shunt-circuiting both relays 6 and the latter are both inactive. Differential protection to the windings 11 and 12 is obtained by the contact strip 34 shunt circuiting but a single relay when both windings are energized. During the periods of inactivity of the relays 5, they return to their initial position by reason of the details of their construction, as is well known in the relay art.

Should the period of activity of either of the relays 6 exceed its time setting, it actuates its switch 28 to close the tripping circuit for the circuit interrupter 6, thereby de-energizing the entire transformer 1.

The taps 14 and 15 may remain in parallel connection to the circuit 13 indefinitely if the motor 8 is stopped.

If it is desired to further raise the voltage of the circuit 13, the motor 8 is again started and the contact segment 42 is disengaged from the tap 14, after which the entire load of the circuit 13 is carried by the lower section of the secondary winding 11 nearest to the circuit 13. At the same time, the current transformer 26 is de-energized, a shunt circuit is completed around the upper relay 5 through the contact members 32 and 29 and the lower relay 5 is rendered active. As the drum 3 continues to turn, the segment 44 is brought into engagement with the tap 16 to place portions of the secondary windings 11 and 12 in parallel circuit but with an unequal number of turns in circuit. Further movement of the drum 3 causes the tap 15 to be disengaged and the tap 17 to be engaged by the segment 43 when both the secondary windings 11 and 12 have the same number of turns connected to the circuit 13.

The foregoing operations may be continued as the taps 18 to 23, inclusive, engage the segments 46 to 51, respectively, if it is desired to further raise the voltage delivered by the transformer 1. It is obvious that when it is desired to lower the voltage of the transformer 1, the motor 8 is caused to turn in the reverse direction by manipulation of the reversing switch 34 and the foregoing cycle of operations takes place in a reverse order.

It will thus be seen that I have provided a transformer tap-changing system in which the secondary windings of the transformer are in parallel relation and are successively open-circuited, have their connections changed, and again inserted in circuit. Time-limit protection is provided for the winding remaining in circuit and the circuits of the time-limit protective devices are regulated in synchronism with the connections of the secondary windings of the transformer, thereby producing alternate periods of activity and inactivity for the time-limit protective devices.

It is to be understood that such changes may be made in the circuits and arrangements of the several parts of my invention as shall fall within the scope of the appended claims.

I claim as my invention:

1. In a transformer tap-changing system, a transformer comprising a plurality of windings connected in parallel circuit, a plurality of taps for each of the windings, means for selectively and severally interrupting the circuit of each of the transformer windings, altering the connections of certain of the taps connected thereto and restoring the circuit thereof, a plurality of relays energized from the windings, and means for controlling the circuit of the several relays in accordance with the connections of the associated windings.

2. In a transformer tap changing system, a transformer comprising a plurality of windings connected in parallel circuit, a plurality of taps connected to different points in each of the windings, means for selectively and severally interrupting the circuit of each of the transformer windings, altering the connections of certain of the taps connected thereto and restoring the circuit thereof, a plurality of relays energized from the windings, and means for selectively shunt-circuiting the relays in accordance with the connections of the associated windings.

3. The combination with a plurality of transformer windings each having a plurality of taps, and means for changing the taps under load by selectively open-circuiting the windings, of a plurality of relays energized from the windings, and means for selectively controlling the circuits of the relays in accordance with the operation of the tap-changing means.

4. The combination with a plurality of transformer windings each having a plurality of taps, and means comprising a drum for changing the taps under load by selectively open-circuiting the windings, of a plurality of relays energized from the windings, and a second drum for selectively controlling the circuits of the relays in accordance with the position of the first-named drum.

5. The combination with a plurality of transformer windings each having a plurality of taps, and means comprising a drum for changing the taps under load by selectively open-circuiting the windings, of a plurality of relays energized from the windings, and a second drum for selectively controlling the circuits of the relays in synchronism with the first-named drum.

6. The combination with a plurality of transformer windings each having a plurality of taps, and means for changing the taps under load by selectively open-circuiting the windings, of a plurality of time-element relays energized from the windings, and means for selectively controlling the periods of activity and inactivity of the relays in accordance with the operation of the tap-changing means.

7. The combination with a plurality of transformer windings, each having a plurality of taps, and means for changing the taps under load by selectively open-circuiting the windings, of a plurality of time-element relays energized from the windings, each of the relays having a time element greater than the period normally required to change the taps on any winding, and means for selectively controlling the periods of activity and inactivity of the relays in accordance with the connections of the windings.

8. In an electrical translating device, a pair of windings in parallel circuit, switching means for selectively open-circuiting the windings, and protective means connected to the windings and operable only when one of the windings is open-circuited.

9. In a transformer system, a pair of windings in parallel circuit, switching means for controlling the connections of the windings, protective means and means actuated by said switching means for controlling the operative period of said protective means.

10. In a transformer system, a plurality of windings in circuit, switching means for varying the connections of the windings, thereby causing an unbalance therebetween, relays having an inverse time element of operation with respect to the degree of unbalance, and means dependent upon the operation of the switching means for jointly controlling the energization of the relays.

11. In a transformer system, a plurality of windings in circuit, switching means for varying the connections of the windings, thereby causing an unbalance therebetween, relays having inverse time elements of operation for protecting the windings, and means responsive to the operation of the switching means for successively imposing duty on the relays but normally having at least one relay actively energized.

In testimony whereof, I have hereunto subscribed my name this 19th day of October, 1925.

ALFRED J. PETERSON.